United States Patent
Kimura et al.

(10) Patent No.: US 9,122,252 B2
(45) Date of Patent: Sep. 1, 2015

(54) MOTOR CONTROL APPARATUS

(71) Applicant: DENSO CORPORATION, Kariya, Aichi-pref. (JP)

(72) Inventors: Kiyoshi Kimura, Kariya (JP); Jun Yamada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 194 days.

(21) Appl. No.: 13/939,634

(22) Filed: Jul. 11, 2013

(65) Prior Publication Data

US 2014/0015467 A1 Jan. 16, 2014

(30) Foreign Application Priority Data

Jul. 13, 2012 (JP) ................................. 2012-157054

(51) Int. Cl.
| | |
|---|---|
| *H02P 6/16* | (2006.01) |
| *G05B 19/29* | (2006.01) |
| *G05B 5/01* | (2006.01) |
| *H02P 6/00* | (2006.01) |
| *H02P 6/24* | (2006.01) |

(52) U.S. Cl.
CPC ........ *G05B 5/01* (2013.01); *H02P 6/002* (2013.01); *H02P 6/24* (2013.01)

(58) Field of Classification Search
CPC .......... H02P 25/08; H02P 6/002; H02P 6/24; H02P 25/082; H02P 25/085; H02P 2209/01; H02P 6/145; H02P 6/16; G05B 5/01; F16H 2061/326; F16H 61/32; F16H 59/105; Y10T 74/2003
USPC ............ 318/603, 602, 701, 466, 563, 400.14, 318/400.38, 437, 445, 266, 652, 721, 400.4, 318/430, 431, 724, 254.1; 74/473.12
See application file for complete search history.

(56) References Cited

U.S. PATENT DOCUMENTS

| | | | |
|---|---|---|---|
| 6,992,451 B2 * | 1/2006 | Kamio et al. ............... | 318/400.4 |
| 7,005,814 B2 * | 2/2006 | Nakai et al. ............... | 318/400.28 |
| 7,084,597 B2 * | 8/2006 | Nakai et al. ................ | 318/254.1 |
| 7,221,116 B2 * | 5/2007 | Nakai et al. .................... | 318/266 |

(Continued)

FOREIGN PATENT DOCUMENTS

| | | |
|---|---|---|
| JP | 05-038196 | 2/1993 |
| JP | 08-019297 | 1/1996 |
| JP | 2002-240381 | 8/2002 |

OTHER PUBLICATIONS

Office Action (2 pages) dated Apr. 11, 2014, issued in corresponding Japanese Application No. 2012-157054 and English translation (3 pages).

*Primary Examiner* — Rita Leykin
(74) *Attorney, Agent, or Firm* — Nixon & Vanderhye PC

(57) ABSTRACT

A motor control apparatus includes a motor that rotates a controlled object, an encoder that outputs a pulse signal in synchronization with a rotation of the motor, and a control section that performs a feedback control so as to rotate the motor to the target rotational position. The control section includes a stopping and holding control portion. The stopping and holding control portion performs a stopping and holding process in which the stopping and holding control portion supplies electric current to the motor so as to stop and hold the motor for a current-supply holding time. The stopping and holding control portion sets the current-supply holding time on the basis of a rotation speed of the motor just before the stopping and holding process.

20 Claims, 5 Drawing Sheets

(56) References Cited

U.S. PATENT DOCUMENTS

| | | | |
|---|---|---|---|
| 7,609,012 B2 * | 10/2009 | Kamio et al. | 318/266 |
| 8,012,563 B2 * | 9/2011 | Kusabiraki et al. | 428/141 |
| 8,013,563 B2 * | 9/2011 | Nakai et al. | 318/701 |
| 8,134,322 B2 * | 3/2012 | Nakai et al. | 318/437 |
| 2003/0222617 A1 | 12/2003 | Nakai et al. | |
| 2006/0006827 A1 | 1/2006 | Nakai et al. | |

* cited by examiner

MOTOR CONTROL APPARATUS

CROSS REFERENCE TO RELATED APPLICATIONS

The present application is based on and claims priority to Japanese Patent Application No. 2012-157054 filed on Jul. 13, 2012, the contents of which are incorporated in their entirety herein by reference.

TECHNICAL FIELD

The present disclosure relates to a motor control apparatus that rotates a motor by switching a current supply phase of the motor on the basis of an output signal of an encoder.

BACKGROUND

Conventionally, in a vehicle, a mechanical driving system is replaced by a system that electrically drives with a motor in order to satisfy requirements of conserving space, improving an assembling process, and improving controllability. For example, JP-A-2004-23890 (corresponding to US 2003/0222617 A1, referred to as a patent document No. 1 hereafter) discloses a system in which a position switching mechanism of an automatic transmission of a vehicle is driven with a motor. The mechanism includes an encoder that outputs a pulse signal at each predetermined angle in synchronization with a rotation of the motor. When a position is switched, the motor is rotated to a target rotational position (target count value) on the basis of a count value of the pulse signal of the encoder (hereafter, referred to as an encoder count value) so as to switch the shift position to a target position.

Each time the target rotational position is changed, the above-described system performs a feedback control in which the system rotates the motor to the target rotational position by sequentially switching a current-supply phase of the motor on the basis of the encoder count value.

If a current supply to a winding of a phase corresponding to the target rotational position is continued after the feedback control ends, the motor can be held at the target rotational position due to electromagnetic force. However, in this configuration, if a stopping time of the motor is long, the current supply to the winding of the same phase is continued for a long time, and the winding may be overheated. Thus, the current supply to the winding is stopped while the motor is stopped so as to restrict overheating of the winding.

However, if the current supply is stopped while the motor is stopped, the electromagnetic force to hold the motor at the target rotational position (the rotational position at the end of the feedback control) disappears. Thus, the rotational position of the motor may be displaced from the target rotational position, and the motor may fail to be normally rotated to the target rotational position, for example, the motor may step out, or the motor may reverse in a direction opposite from the target rotational position, when the next feedback control starts.

In order to solve the above-described issues, in the invention disclosed in the patent document No. 1, a stopping and holding process, in which electric current is supplied so as to stop and hold the motor, is performed for a predetermined current-supply holding time at the start or the end of the feedback control. Accordingly, step-out or reverse at the start of the feedback control can be restricted while restricting overheating of the winding.

According to a study by the inventors, when the stopping and holding process is performed for the predetermined current-supply holding time, a current-supply holding time required for bringing the motor to a stopping and holding state changes with a rotation speed of the motor just before the stopping and holding process. For example, when the rotation speed of the motor just before the stopping and holding process is high, the current-supply holding time required for bringing the motor to the stopping and holding state is long. On the other hand, when the rotation speed of the motor just before the stopping and holding process is low, the current-supply holding time required for bringing the motor to the stop holding state is short.

However, the patent document No. 1 does not take into consideration influence of the rotation speed of the motor just before the stopping and holding process and the current-supply holding time is set to a predetermined fixed value. Thus, the current-supply holding time needs to be set to a value longer than or equal to the maximum value required for bringing the motor to the stopping and holding state in anticipation of the worst case, that is, a case in which a time required for bringing the motor to the stop holding state is the longest. Thus, in most cases, the current supply holding time is longer than necessary, an execution time of the stopping and holding process is longer than necessary, and power consumption is more than necessary.

SUMMARY

An object of the present disclosure is to provide a motor control apparatus that can restrict a current-supply holding time from being elongated more than necessary, can reduce an execution time of a stopping and holding process, and can reduce power consumption.

A motor control apparatus according to an aspect of the present disclosure includes a motor, an encoder, and a control section. The motor rotates a controlled object. The encoder outputs a pulse signal in synchronization with a rotation of the motor. The control section performs a feedback control in which each time a target rotational position is changed, the control section sequentially switches a current-supply phase of the motor on the basis of a count value of the pulse signal outputted from the encoder so as to rotate the motor to the target rotational position. The control section stops supplying electric current to the motor after performing the feedback control.

The control section includes a stopping and holding control portion. The stopping and holding control portion performs a stopping and holding process in which the stopping and holding control portion supplies electric current to the motor so as to stop and hold the motor for a current-supply holding time. The stopping and holding control portion sets the current-supply holding time on the basis of a rotation speed of the motor just before the stopping and holding process.

The motor control apparatus can restrict the current-supply holding time from being elongated more than necessary, can reduce an execution time of the stopping and holding process, and can reduce power consumption.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

An embodiment in which a motor control apparatus is applied to a position switching apparatus of an automatic transmission will be described below.

Figure 1:
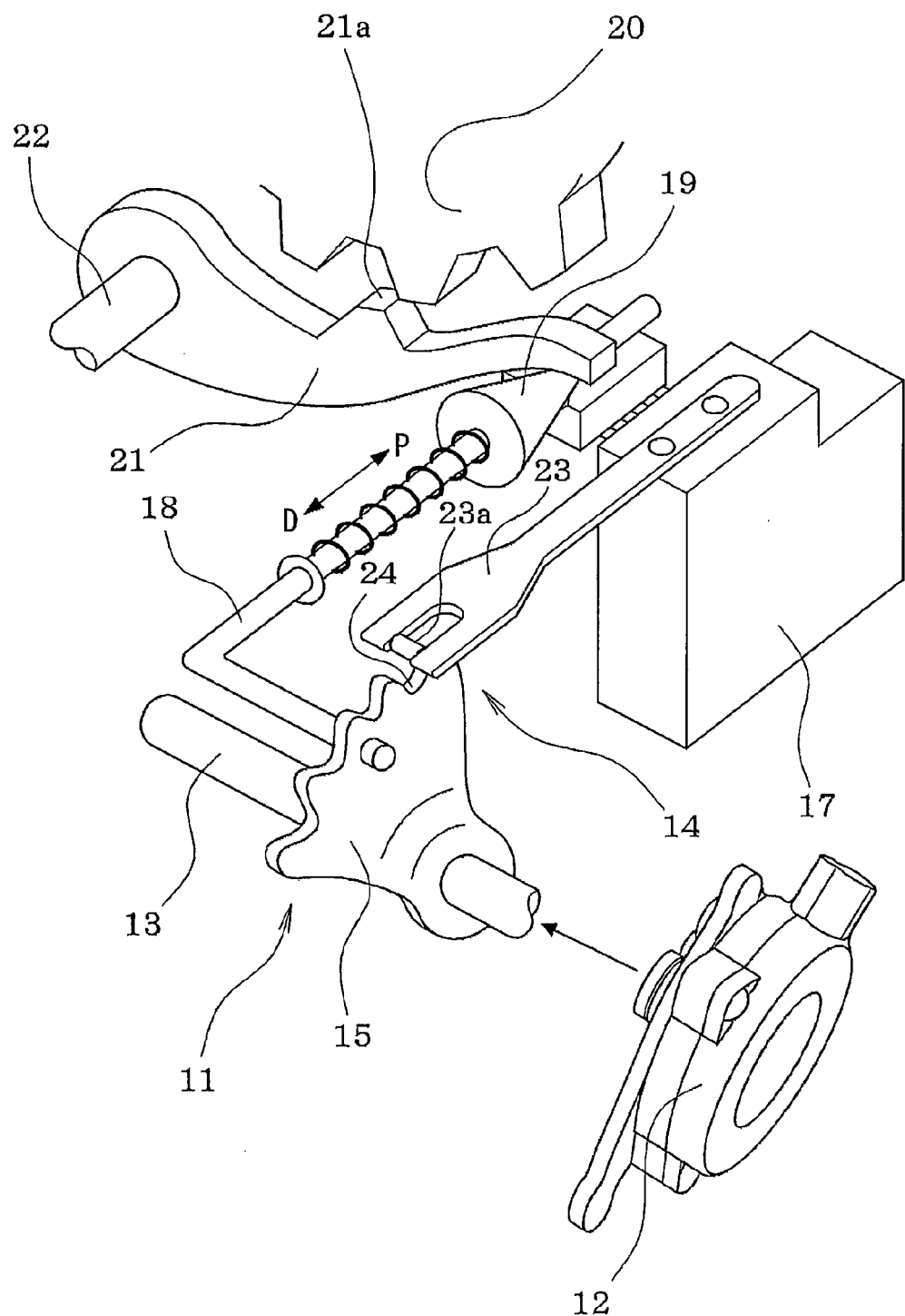
FIG. 1 is a perspective view of a position switching apparatus according to an embodiment of the present disclosure.
Figure 2:
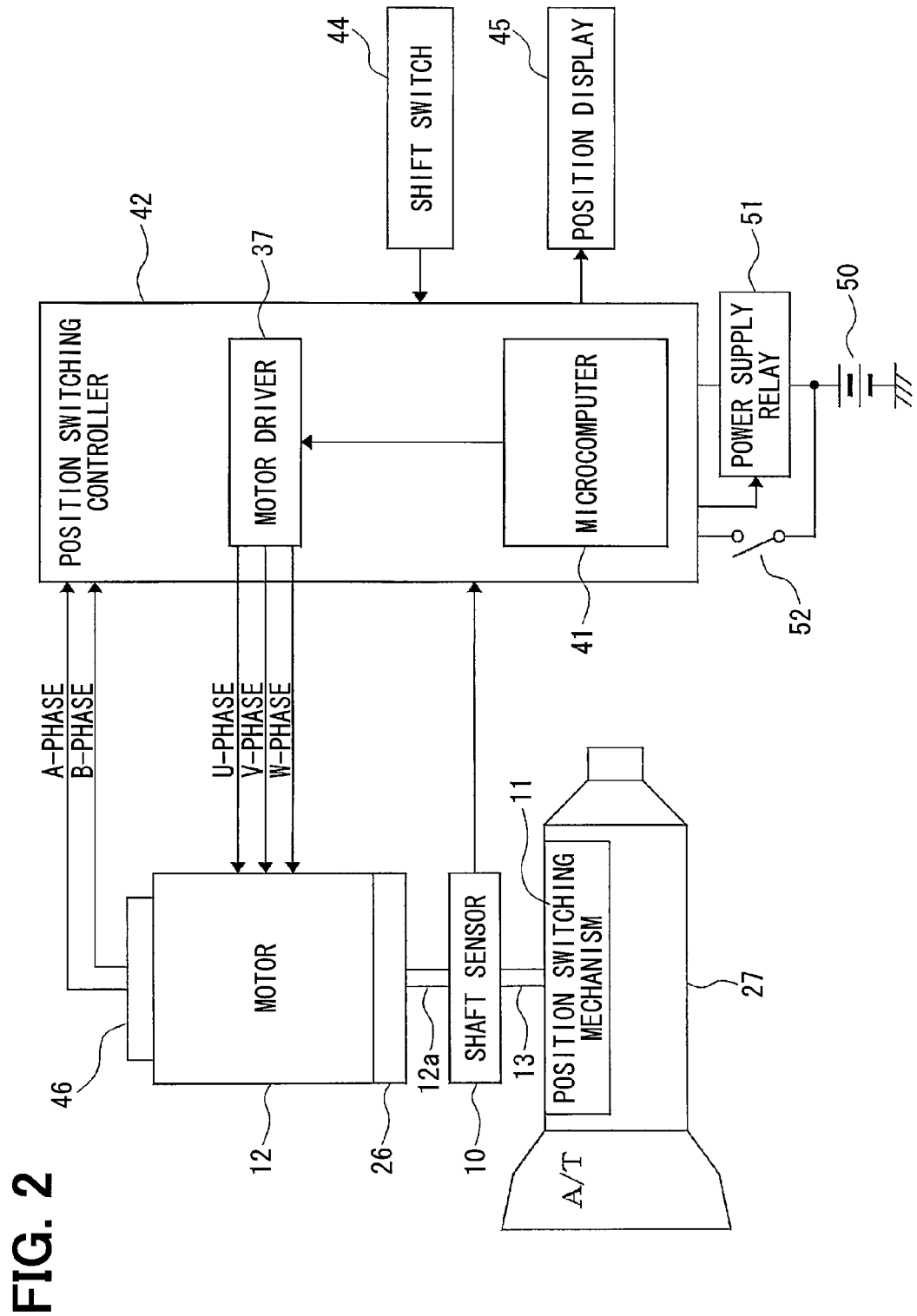
FIG. 2 is a diagram showing a configuration of a control system of the position switching apparatus.

A configuration of the position switching apparatus will be described with reference to FIG. 1 and FIG. 2. As shown in FIG. 1, a position switching mechanism 11 is a 4-position switching mechanism that switches a shift position of an automatic transmission 27 (see FIG. 2) among park (P), reverse (R), neutral (N), and drive (D). A motor 12 working as a driving force of the position switching mechanism 11 may be, for example, a switched reluctance motor. The switched reluctance motor has an advantage that a permanent magnet is unnecessary and a structure is simple. As shown in FIG. 2, the motor 12 includes a speed-reducing mechanism 26 and an output shaft 12a. A rotational position of the output shaft 12a is detected by an output shaft sensor 10. The output shaft 12a of the motor 12 is connected with a manual shaft 13. To the manual shaft 13, a detent lever 15 is fixed.

In addition, to the detent lever 15, a parking rod 18 having an L-shape is fixed. The parking rod 18 has a conical body 19 at an end portion, and the conical body 19 is in contact with a lock lever 21. The lock lever 21 moves up and down centering on a shaft 22 depending on a position of the conical body 19 to lock and release the parking gear 20. The parking gear 20 is attached to an output shaft of the automatic transmission 27. When the parking gear 20 is locked by the lock lever 21, driving wheels of the vehicle are held at a parking state in which the driving wheels are restricted from rotating.

A detent spring 23 for holding the detent lever 15 at each of the positions P, R, N, D is fixed to a support base 17. The detent lever 15 has position holding recesses 24 corresponding to the respective positions P, R, N, D (see FIG. 1). When an engagement portion 23a provided at an end of the detent spring 23 is fitted in one of the position holding recesses 24, the detent lever 15 is held at a corresponding one of the positions. The detent lever 15 and the detent spring 23 form a detent mechanism 14 for holding a rotational position of the detent lever 15 at each of the positions.

In the P-position, the parking rod 18 moves in a direction approaching the lock lever 21, a thick portion of the conical body 19 lifts up the lock lever 21, and a projection 21a of the lock lever 21 is fitted in the parking gear 20 to lock the parking gear 20. Accordingly, the output shaft of the automatic transmission 27 and the driving wheels are held in a locked state (i.e., the parking state).

In the positions other than the P-position, the parking rod 18 moves in a direction away from the lock lever 21, the thick portion of the conical body 19 moves out of the lock lever 21, and the lock lever 21 moves downward. Accordingly, the projection 21a of the lock lever 21 separates from the parking gear 20, the locked state of the parking gear 20 is released, and the output shaft of the automatic transmission 27 is held in a rotatable state, that is, in a state where the vehicle can travel.

The detent lever 15 is connected with a manual valve (not shown) that moves linearly depending on the rotation of the detent lever 15. The shift position is switched among the P-position, the R-position, the N-position, and the D-position when a hydraulic circuit (not shown) in the automatic transmission 27 is switched with the manual valve.

The output shaft sensor 10 includes a rotation sensor (e.g., potentiometer) that outputs a voltage depending on a rotation angle of the output shaft 12a of the speed-reducing mechanism 26. On the basis of an output voltage of the output shaft sensor 10, the actual shift position can be confirmed to be the P-position, the R-position, the N-position, or the D-position. Also in a case where the output shaft sensor 10 is not provided, the actual shift position can be confirmed to be the P-position, the R-position, the N-position, or the D-position using an encoder 46.

As shown in FIG. 2, the motor 12 includes the encoder 46 to detect a rotation angle (rotational position) of a rotor. The encoder 46 may be a magnetic rotary encoder. The encoder 46 outputs a pulsed A-phase signal and a pulsed B-phase signal to the position switching controller 42 at each predetermined angle in synchronization with the rotation of the rotor. A microcomputer 41 of the position switching controller 42 (motor controller) counts rising edges and falling edges of the A-phase signal and the B-phase signal, and drives the motor 12 by switching a current-supply phase of the motor 12 with a motor driver 37 on the basis of a count value (hereafter, referred to as an encoder count value). Two systems of combination of three-phase (U-phase, V-phase, W-phase) windings of the motor 12 and the motor driver 37 may be provided so that the motor 12 can be driven with one system even when the other system malfunctions.

When the motor 12 rotates, a rotation direction of the motor 12 is determined on the basis of a generation order of the A-phase signal and the B-phase signal. The encoder count value is counted up when the motor 12 rotates in a normal direction (a rotation direction from the P-position to the D-position), and the encoder count value is counted down when the motor 12 rotates in a reverse direction (a rotation direction from the D-position to the P-position). Accordingly, a correspondence relationship between the encoder count value and the rotation angle of the motor 12 can be kept when the motor 12 rotates in any direction of the normal direction and the reverse direction. Accordingly, when the motor 12 rotates in any direction of the normal direction and the reverse direction, the rotational position of the motor 12 is detected on the basis of the encoder count value, and electric current is supplied to the winding of the phase corresponding to the rotational position so as to rotate the motor 12.

The position switching controller 42 receives a signal of a shift lever operation position detected by a shift switch 44. Accordingly, the microcomputer 41 in the position switching controller 42 switches a target position on the basis of a shift lever operation by a driver and a vehicle state (e.g., a vehicle speed, an on-off state of a brake, an on-off state of an engine, and a vehicle power supply transition state if the vehicle is EV or HEV). The motor 12 is driven to switch the shift position on the basis of the target position, and an actual shift position after switching is displayed on a position display 45.

The position switching controller 42 is supplied with power-supply voltage from a battery 50 (power supply) mounted in the vehicle through a power supply relay 51. An on-off state of the power supply relay 51 is switched when an on-off state of an ignition switch 52, which functions as a power supply switch, is manually operated. When the ignition switch 52 is turned on, the power supply relay 51 is turned on, and the voltage is supplied to the position switching controller 42. When the ignition switch 52 is turned off, the power supply relay 51 is turned off, and the power supply to the position switching controller 42 is stopped.

The encoder count value is stored in a random access memory (RAM), which is not shown. Thus, when the power supply to the position switching controller 42 is stopped, the stored value of the encoder count value is erased. Thus, the encoder count value just after power on the position switching controller 42 does not correspond to the actual rotational position (current-supply phase) of the motor 12. In order to switch the current-supply phase on the basis of the encoder current value, the encoder count value needs to correspond to the actual rotational position of the motor 12 after power on so that the encoder count value corresponds to the current-supply phase.

Thus, the microcomputer 41 performs an initial driving after power on to learn a correspondence relationship between the current-supply phase of the motor 12 and the encoder count value. In the initial driving, the microcomputer 41 makes round of switching the current-supply phase of the motor 12 on a predetermined time schedule by an open-loop control so as to correspond the rotational position of the motor 12 with any current-supply phase and to rotate the motor 12, and counts edges of the A-phase signal and the B-phase signal. Then, the microcomputer 41 learns the correspondence relationship between the encoder count value and the rotational position of the motor 12 at the end of the initial driving.

The microcomputer 41 can detect the rotation amount (rotation angle) from a start position of the motor 12 only on the basis of the encoder count value after the motor 12 is powered on. Thus, the microcomputer 41 cannot rotate the motor 12 to a target position with accuracy if the microcomputer 41 does not detect an absolute rotational position of the motor 12 after power on.

Thus, the microcomputer 41 performs a P-position wall hitting control after the initial driving. In the P-position wall hitting control, the microcomputer 41 rotates the motor 12 until the engagement portion 23a of the detent spring 23 hits a P-position wall (a sidewall of the P-position holding recess 24) that is a P-position-side limit position of a movable range of the position switching mechanism 11. Then, the microcomputer 41 learns the P-position-side limit position as a reference position, and controls the rotation amount (rotation angle) of the motor 12 using the reference position as reference of the encoder count value. Alternatively, the microcomputer 41 may perform a D-position wall hitting control. In the D-position wall hitting control, the microcomputer 41 rotates the motor 12 until the engagement portion 23a of the detent spring 23 hits a D-position wall (a sidewall of the D-position holding recess) that is a D-position-side limit position of the movable range of the position switching mechanism 11. Then, the microcomputer 41 may learn the D-position-side limit position as a reference position. After performing the hitting control, the microcomputer 41 may perform a return control. In the return control, the microcomputer 41 reverses the rotation direction of the motor 12 and rotates back the rotational position of the motor 12 by a predetermined amount to get rid of a bending deformation of the detent spring 23.

When the target position is switched by the shift lever operation by the driver after the microcomputer 41 learns the reference position, the microcomputer 41 changes the target rotational position (the target count value) on the basis of the target position. Then, the microcomputer 41 performs a feedback control. In the feedback control, each time the target rotational position is changed, the microcomputer 41 sequentially switches the current-supply phase of the motor 12 on the basis of the encoder count value to rotate the motor 12 to the target rotational position. After the feedback control, the microcomputer 41 stops the current supply to the motor 12.

When the current supply to the winding of the phase corresponding to the target rotational position is continued after the feedback control, the motor 12 can be held at the target rotational position due to electromagnetic force. However, in this configuration, if a stopping time of the motor 12 is long, the current supply to the winding of the same phase is continued for a long time, and the winding may be overheated. Thus, the current supply to the winding is stopped while the motor is stopped so as to restrict overheating of the winding.

However, if the current supply is stopped while the motor 12 is stopped, the electromagnetic force to hold the motor at the target rotational position (the rotational position at the end of the feedback control) disappears. Thus, the rotational position of the motor 12 may be displaced from the target rotational position, and the motor 12 may fail to be normally rotated to the target rotational position, for example, the motor 12 may step out, or the motor 12 may reverse in a direction opposite from the target rotational position, when the next feedback control starts.

Figure 3:
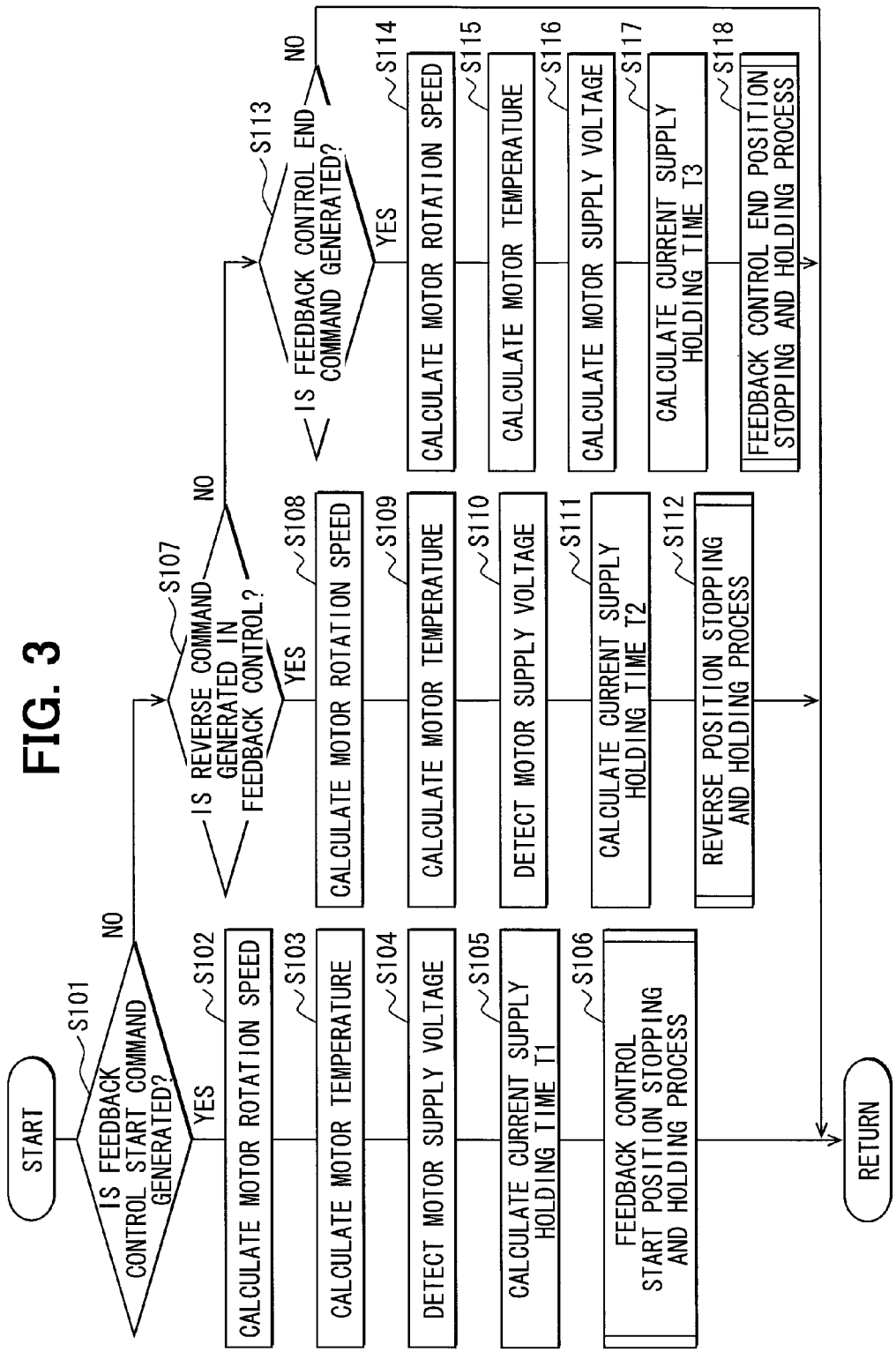
FIG. 3 is a flowchart showing a stopping and holding process.

In order to solve the above-described issue, in the present embodiment, the microcomputer 41 performs a stopping and holding control routine shown in FIG. 3. In the stopping and controlling routine, the microcomputer 41 performs a stopping and holding process, in which electric current is supplied to the motor 12 so as to stop and hold the motor 12, for a predetermined current-supply holding time in a predetermined period (e.g., at the start of the feedback control). Accordingly, step-out or reverse at the start of the feedback control can be restricted while restricting overheating of the winding.

Specifically, when the microcomputer 41 starts the feedback control from a state where electric current is not supplied to the motor 12, the microcomputer 41 performs a "feedback control start position stopping and holding process" for a current-supply holding time T1. In the feedback control start position stopping and holding process, the microcomputer 41 selects the current-supply phase on the basis of the present encoder count value and supplies electric current to the motor 12 to stop and hold the motor 12 at the rotational position at the start of the feedback control. After performing the feedback control start position stopping and holding process, the microcomputer 41 performs the feedback control so as to rotate the motor 2 to the target rotational position.

Accordingly, even when the rotational position of the motor 12 displaces while the motor 12 is stopped, the displacement of the rotational position of the motor 12 can be corrected by the feedback control start position stopping and holding process just before the start of the feedback control, and the rotational position of the motor 12 at the start of the feedback control can be positioned with accuracy. Thus, the microcomputer 41 can synchronize the rotational position of the motor 12 and the current-supply phase (the encoder count value) from the first current-supply phase at the start of the feedback control, and can restrict step-out or reverse of the motor 12 at the start of the feedback control. Therefore, the microcomputer 41 can stably perform the feedback control so as to rotate the motor 12 to the target rotational position with certainty and can perform a position switching control (positioning control) with high stability and high reliability.

When the target rotational position is changed in the feedback control and the microcomputer 41 needs to reverse the rotation direction of the motor 12, the microcomputer 41 performs a "reverse position stopping and holding process" for a current-supply holding time T2. In the reverse position stopping and holding process, the microcomputer 41 selects the current-supply phase to stop and hold the motor 12 at a reverse position (rotational position at reverse rotation) and supplies electric current so as to stop and hold the motor 12 at the reverse direction. After performing the reverse position stopping and holding process, the microcomputer 41 restarts the feedback control to rotate the motor 12 to the target rotational position after change.

In this way, when the target rotational position is changed in the feedback control, the microcomputer 41 can position the reverse position of the motor 12 and can stably perform the reverse operation. Thus, the microcomputer 41 can restrict step-out of the motor 12 due to displacement of the reverse position and can certainly rotate the motor 12 to the target rotation position after change.

When the microcomputer 41 ends the feedback control, the microcomputer 41 performs a "feedback control end position stopping and holding process" for a current-supply holding time T3. In the feedback control end position stopping and holding process, the microcomputer 41 selects the current-supply phase to stop and hold the motor 12 at a rotational position (target rotational position) at the end of the feedback control, and supplies electric current to stop and hold the motor 12 at the rotational position at the end of the feedback control. After the feedback control end position stopping and holding process, the microcomputer 41 stops the current supply to the motor 12.

Accordingly, the microcomputer 41 can stop the current supply after the motor 12 arrives at the target rotational position and vibration of the motor 12 stops. Thus, the stopping position of the motor 12 does not largely displace from the target rotational position due to inertia force.

In the present embodiment, the microcomputer 41 transitions from the feedback control to the feedback control end position sopping and holding process when a difference between the encoder count value and the target count value corresponding to the target rotational position is less than or equal to a predetermined value (e.g., a count value corresponding to a phase lead of the current-supply phase). In order to rotate the motor 12, the microcomputer 41 needs to advance the phase of the current-supply phase by 2 through 4 counts (3.75 degrees through 15 degrees in the rotation angle of the rotor) from the actual rotational position of the motor 2. Thus, if the microcomputer 41 ends the feedback control when the difference between the encoder count value and the target count value becomes the count value corresponding to the phase lead of the current-supply phase in the feedback control, the last current-supply phase of the feedback control corresponds to the current-supply phase to stop and hold the motor 12 at the target rotation position. Thus, even after transition to the feedback control end position stopping and holding process, the microcomputer 41 can continue to supply electric current to the last current-supply phase of the feedback control, and the microcomputer 41 can smoothly transition from the feedback control to the feedback end position stopping and holding process.

When the stopping and holding process is performed for the predetermined current supply holding time, a current supply holding time required for bringing the motor 12 to the stopping and holding state changes with the rotation speed of the motor 12 just before the stopping and holding process. For example, when the rotation speed of the motor 12 just before the stopping and holding process is high, the current supply holding time required for bringing the motor 12 to the stopping and holding state is long. On the other hand, when the rotation speed of the motor 12 just before the stopping and holding process is low, the current supply holding time required for bring the motor 12 to the stop holding state is short.

However, the patent document No. 1 does not take into consideration influence of the rotation speed of the motor 12 just before the stopping and holding process and the current supply holding time is set to a predetermined fixed value. Thus, the current supply holding time needs be set to a value longer than or equal to the maximum value required for bringing the motor 12 to the stopping and holding state in anticipation of the worst case, that is, a case in which a time required for bringing the motor 12 to the stop holding state is the longest. Thus, in most cases, the current supply holding time is longer than necessary, an execution time of the stopping and holding process is longer than necessary, and power consumption is more than necessary.

In order to solve the above-described issue, in the present embodiment, the microcomputer 41 performs the stopping and holding control routine. In the stopping and holding control routine, when the microcomputer 41 performs the stopping and holding process, such as the feedback start position stopping and holding process, the reverse position stopping and holding process, and the feedback control end position stopping and holding process, the microcomputer 41 sets the current-supply holding time on the basis of the rotation speed of the motor 12 just before the stopping and holding process.

Accordingly, corresponding to the fact that the current-supply holding time required for bringing the motor 12 to the stopping and holding state changes depending on the rotation speed of the motor 12 just before the stopping and holding process, the microcomputer 41 can change the current-supply holding time to an appropriate value (e.g., a minimum required value or a value that is little longer than the minimum required value).

When the temperature of the motor 12 increases, a resistance of the winding increases, electric current that flows to the winding decreases, and generated electromagnetic force decreases. Thus, the current-holding time required for bringing the motor 12 into the stopping and holding state increases with increase in temperature of the motor 12. In addition, when a supply voltage of the motor 12 (i.e., a voltage of the battery 50) decreases, electric current that flows to the winding decreases, and generated electromotive force decreases. Thus, the current-holding time required for bringing the motor 12 into the stopping and holding state increases with decrease in temperature of the motor 12.

In view of the above-described properties, the microcomputer 41 corrects the current-supply holding time on the basis of the temperature of the motor 12 and the supply voltage of the motor 12. Accordingly, corresponding to the fact that the current-supply holding time required for bringing the motor 12 to the stopping and holding state changes depending on the temperature of the motor 12 and the supply voltage of the motor 12, the microcomputer 41 can correct the current-supply holding time to an appropriate value.

The microcomputer 41 in the position switching controller 42 performs the stopping and holding control according to the stopping and holding control routine shown in FIG. 3.

The microcomputer 41 can work as a control section including a stopping and holding control portion, and the microcomputer 41 repeats the stopping and holding control routine shown in FIG. 3 with a predetermined period while the position switching controller 42 is powered on. When the stopping and holding control routine starts, firstly the microcomputer 41 determines at S101 whether the feedback control start command is generated. The feedback control start command is generated, for example, when the target position is switched by the shift lever operation by the user and the target rotational position (the target count value) is changed.

When the microcomputer 41 determines at S101 that the feedback control start command is generated, the microcomputer 41 proceeds to S102. At S102, the microcomputer 31 calculates the current rotation speed of the motor 12 on the basis of a time interval (e.g., the time intervals of the edges of the rising edges of the A-phase signal and the B-phase signal) of an output signal of the encoder 46 to calculate the rotation speed of the motor 12 just before the feedback control start position stopping and holding process.

After that, the microcomputer 41 proceeds to S103 at which the microcomputer 41 calculates a temperature of the motor 12 on the basis of, for example, a detected value of an oil temperature sensor (not shown) that detects a temperature of hydraulic oil of the automatic transmission 27. Then, a S104, the microcomputer 41 reads the supply voltage of the motor 12 (the voltage of the battery 50) detected with a voltage sensor (not shown).

After that, at S105, the microcomputer 41 calculates the current-supply holding time T1 of the feedback control start position stopping and holding process. Firstly, the microcomputer 41 calculates the current-supply holding time T1 on the basis of the rotation speed of the motor 12 just before the feedback control start position stopping and holding process using a map or an equation for the feedback control start position stopping and holding process.

Figure 4:
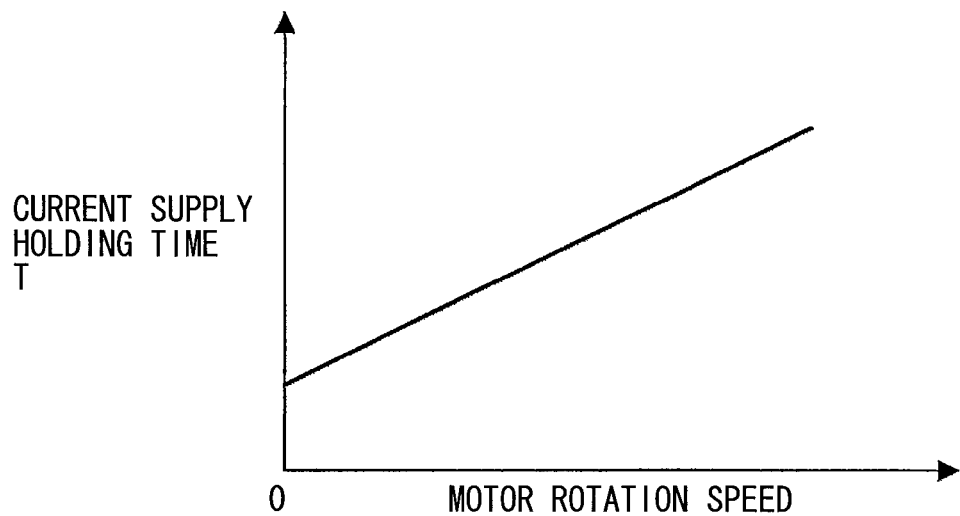
FIG. 4 is a diagram showing an example of a map of a current-supply holding time.

A map or an equation (see FIG. 4) for calculating a current-supply holding time T, which is a generic term used to refer to current-supply holding times T1-T3, is separately prepared for the feedback control start position stopping and holding process, the reverse position stopping and holding process, and the feedback control end position stopping and holding process. The map or the equation is set in such a manner that the current-supply holding time T increases with increase in the rotation speed of the motor 12 just before the process. Accordingly, corresponding to the fact that the current-supply holding time T required for bringing the motor 12 to the stopping and holding state increases with increase in the rotation speed of the motor 12, the microcomputer 41 increases the current-supply holding time T with increase in the rotation speed of the motor 12 just before the process. The map or the equation for calculating the current-supply holding time T is previously prepared on the basis of test data or design data, and is stored in a ROM in the microcomputer 41.

The map or equation for the feedback control start position stopping and holding process is set so that the current-supply holding time T1 of the feedback control start position stopping and holding process is shorter than the current-supply holding time T2 of the reverse position stopping and holding process and the current-supply holding time T3 of the feedback control end position stopping and holding process when the rotation speeds of the motor 12 just before the processes are the same.

Figure 5:
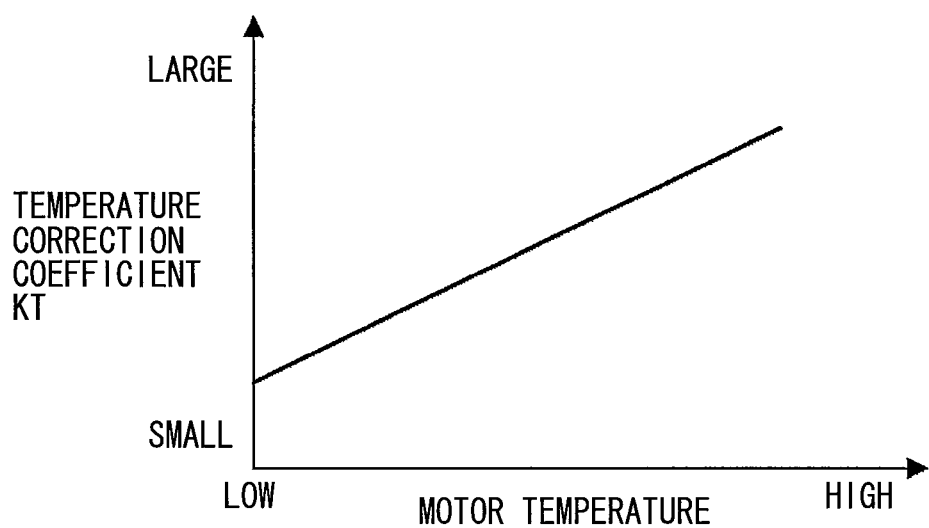
FIG. 5 is a diagram showing an example of a map of a temperature correction coefficient.

In addition, the microcomputer 41 calculates a temperature correction coefficient KT1 on the basis of the temperature of the motor 12 using a map or an equation for the feedback control start position stopping and holding process. A map or an equation (see FIG. 5) for calculating a temperature correction coefficient KT, which is a generic term used to refer to temperature correction coefficients KT1-KT3, is separately prepared for the feedback control start position stopping and holding process, the reverse position stopping and holding process, and the feedback control end position stopping and holding process. The map or the equation is set in such a manner that the temperature correction coefficient KT increases with increase in temperature of the motor 12 just before the process. Accordingly, corresponding to the fact that the current-supply holding time required for bringing the motor 12 to the stopping and holding state increases with increase in the temperature of the motor 12, the microcomputer 41 increases the temperature correction coefficient KT with increase in the temperature of the motor 12 just before the process so as to increase the current-supply holding time T. The map or the equation used for calculating the temperature correction coefficient KT is previous prepared on the basis of test data or design data, and is stored in the ROM in the microcomputer 41.

Figure 6:
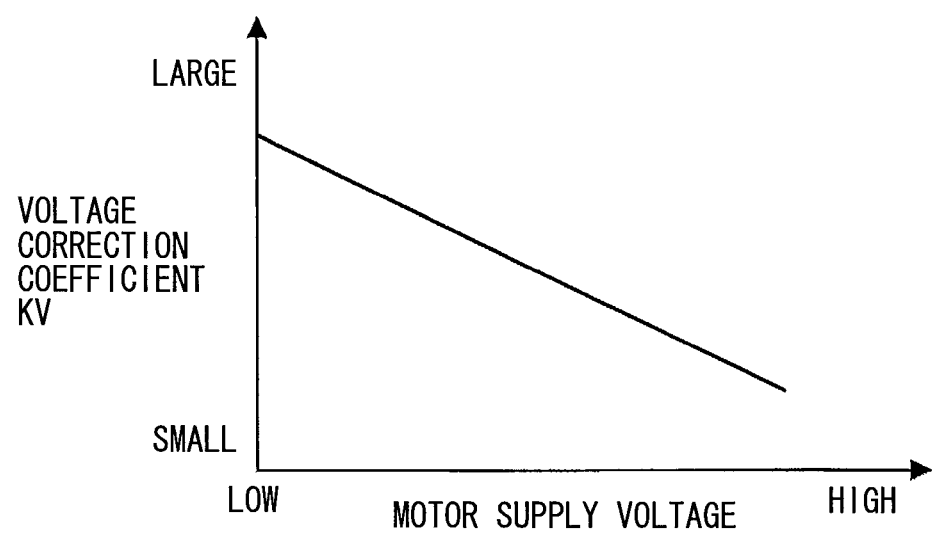
FIG. 6 is a diagram showing an example of a map of a voltage correction coefficient.

Furthermore, the microcomputer 41 calculates a voltage correction coefficient KV1 on the basis of the supply voltage of the motor 12 using a map or an equation for the feedback control start position stopping and holding process. A map or an equation (see FIG. 6) for calculating a voltage correction coefficient KV, which is a generic term used to refer to temperature correction coefficients KV1-KV3, is separately prepared for the feedback control start position stopping and holding process, the reverse position stopping and holding process, and the feedback control end position stopping and holding process. The map or the equation is set in such a manner that the voltage correction coefficient KV increases with decrease in the supply voltage of the motor 12 just before the process. Accordingly, corresponding to the fact that the current-supply holding time required for bringing the motor 12 to the stopping and holding state increases with decrease in the supply voltage of the motor 12, the microcomputer 41 increases the voltage correction coefficient KV with decrease in the supply voltage of the motor 12 just before the process so as to increase the current-supply holding time T. The map or the equation used for calculating the voltage correction coefficient KV is previous prepared on the basis of test data or design data, and is stored in the ROM in the microcomputer 41.

After that, the microcomputer 41 corrects the current-supply holding time T1 with the temperature correction coefficient KT1 and the voltage correction coefficient KV1 to calculate a corrected current-supply holding time T1.

The corrected current-supply holding time T1=the current-supply holding time T1 before correction×KT1×KV1

Then, at S106, the microcomputer 41 performs the feedback control start position stopping and holding process, in which the microcomputer 41 supplies electric current to the motor 12 so as to stop and hold the motor 12 at the rotational position at the start of the feedback control, for the corrected current-supply holding time T1. After performing the feedback control start position stopping and holding process, the microcomputer 41 performs the feedback control so as to rotate the motor 12 to the target rotational position.

When the microcomputer 41 determines at S101 that the feedback control start command is not generated, the microcomputer 41 proceeds to S107 and determines whether a reverse command is generated in the feedback control. The reverse command is generated, for example, when the target rotational position is changed in the feedback control and the rotation direction of the motor 12 needs to be reversed.

When the microcomputer 41 determines at S107 that the reverse command is generated in the feedback control, the microcomputer 41 proceeds to S108. At S108, the microcomputer 41 calculates the current rotation speed of the motor 12 on the basis of the time interval of the output signals of the encoder 46 to calculate the rotation speed of the motor 12 just before the reverse position stopping and holding process. After that, the microcomputer 41 proceeds to S109 at which the microcomputer 41 calculates the temperature of the motor 12 on the basis of, for example, the detection value of the oil temperature sensor. Then, the microcomputer 41 proceeds to S110 at which the microcomputer 41 reads the supply voltage of the motor 12 detected by the voltage sensor.

After that, the microcomputer 41 proceeds to S111 at which the microcomputer 41 calculates the current-supply holding time T2 of the reverse position stopping and holding process. Firstly, the microcomputer 41 calculates the current holding time T2 on the basis of the rotation speed of the motor 12 just before the reverse position stopping and holding process using the map or the equation for the reverse position stopping and holding process.

The map or equation for the reverse position stopping and holding process is set so that the current-supply holding time T2 of the reverse position stopping and holding process is longer than the current-supply holding time T1 of the feedback control start position stopping and holding process when the rotation speeds of the motor 12 just before the processes are the same.

In addition, the microcomputer 41 calculates the temperature correction coefficient KT2 on the basis of the temperature of the motor 12 using the map or the equation for the reverse position stopping and holding process. Furthermore, the microcomputer 41 calculates the voltage correction coefficient KV2 on the basis of the supply voltage of the motor 12 using the map or the equation for the reverse position stopping and holding process.

After that, the microcomputer 41 corrects the current-supply holding time T2 with the temperature correction coefficient KT2 and the voltage correction coefficient KV2 to calculate a corrected current-supply holding time T2. The corrected current-supply holding time T2=the current-supply holding time T2 before correction×KT2×KV2

Then, at S112, the microcomputer 41 performs the reverse position stopping and holding process, in which the microcomputer 41 supplies electric current to the motor 12 to stop and hold the motor 12 at the reverse position, for the corrected current-supply holding time T2. After performing the reverse position stopping and holding process, the microcomputer 41 restarts the feedback control so as to rotate the motor 12 to the target rotational position after change.

When the microcomputer 41 determines at S107 that the reverse command is not generated in the feedback control, the microcomputer 41 proceeds to S113 at which the microcomputer 41 determines whether a feedback control end command is generated. The feedback control end command is generated, for example, when the difference between the encoder count value and the target count value corresponding to the target rotational position is less than or equal to the predetermined value (e.g., the count value corresponding to the phase lead of the current-supply phase).

When the microcomputer 41 determines at S113 that the feedback control end command is generated, the microcomputer 41 proceeds to S114. At S114, the microcomputer 41 calculates the current rotation speed of the motor 12 on the basis of the time interval of the output signals of the encoder 46 to calculate the rotation speed of the motor 12 just before the feedback control end position stopping and holding process. After that, the microcomputer 41 proceeds to S115 at which the microcomputer 41 calculates the temperature of the motor 12 on the basis of, for example, the detection value of the oil temperature sensor. Then, the microcomputer 41 proceeds to S116 at which the microcomputer 41 reads the supply voltage of the motor 12 detected by the voltage sensor.

After that, at S117, the microcomputer 41 calculates the current-supply holding time T3 of the feedback control end position stopping and holding process. Firstly, the microcomputer 41 calculates the current-supply holding time T3 on the basis of the rotation speed of the motor 12 just before the feedback control end position stopping and holding process using the map or the equation for the feedback control end position stopping and holding process.

The map or equation for the feedback control end position stopping and holding process is set so that the current-supply holding time T3 of the feedback control end position stopping and holding process is longer than the current-supply holding time T2 of the reverse position stopping and holding process when the rotation speeds of the motor 12 just before the processes are the same.

In addition, the microcomputer 41 calculates the temperature correction coefficient KT3 on the basis of the temperature of the motor 12 using the map or the equation for the feedback control end position stopping and holding process. Furthermore, the microcomputer 41 calculates the voltage correction coefficient KV3 on the basis of the supply voltage of the motor 12 using the map or the equation for the feedback control end position stopping and holding process.

After that, the microcomputer 41 corrects the current-supply holding time T3 with the temperature correction coefficient KT3 and the voltage correction coefficient KV3 to calculate a corrected current-supply holding time T3. The corrected current-supply holding time T3=the current-supply holding time T3 before correction×KT3×KV3

Then, at S118, the microcomputer 41 performs the feedback control end position stopping and holding process in which the microcomputer 41 supplies electric current to the motor 12 so as to stop and hold the motor 12 at the rotational position at the end of the feedback control for the corrected current-supply holding time T3. After the feedback control end position stopping and holding process, the microcomputer 41 stops the current supply to the motor 12.

In the routine shown in FIG. 3, the microcomputer 41 calculates the temperature of the motor 12 on the basis of, for example, the detected value of the oil temperature sensor that detects the temperature of hydraulic oil of the automatic transmission 27. The microcomputer 41 may estimate the temperature of the motor 12 by another way. For example, the microcomputer 41 may detect the temperature of the motor 12 using a temperature sensor.

In the present embodiment, when the microcomputer 41 performs the stopping and holding process, such as the feedback control start position stopping and holding process, the reverse position stopping and holding process, and the feedback control end position stopping and holding process, the microcomputer 41 sets the current-supply holding time on the basis of the rotation speed of the motor 12 just before the stopping and holding process. Corresponding to the fact that the current-supply holding time required for bringing the motor 12 to the stopping and holding state changes depending on the rotation speed of the motor 12 just before the stopping and holding process, the microcomputer 41 changes the current-supply holding time to an appropriate value (e.g., the minimum required value or the value that is little longer than the minimum required value). Because the current-supply holding time is not elongated more than necessary, the execution time of the stopping and holding process and the switching time of the shift position can be reduced, a shift feeling can be improved, and power consumption can be reduced.

In addition, in the present embodiment, the microcomputer 41 corrects the current-supply holding time on the basis of the temperature of the motor 12 and the supply voltage of the motor 12. Accordingly, corresponding to the fact that the current-supply holding time required for bringing the motor 12 to the stopping and holding state changes depending on the temperature of the motor 12 and the supply voltage of the motor 12, the microcomputer 41 can correct the current-supply holding time to an appropriate value.

Other Embodiments

In the above-described embodiment, the microcomputer 41 corrects the current-supply holding time on the basis of both of the temperature of the motor 12 and the supply voltage of the motor 12. However, the microcomputer 41 may correct the current-supply holding time on the basis of only one of the temperature of the motor 12 and the supply voltage of the motor 12. The microcomputer 41 may omit the correction on the basis of the temperature of the motor 12 and the supply voltage of the motor 12.

In the above-described embodiment, the present disclosure is applied to all of the feedback control start position stopping and holding process, the reverse position stopping and holding process, and the feedback control end position stopping and holding process. The present disclosure may be applied to one or two of the feedback control start position stopping and holding process, the reverse position stopping and holding process, and the feedback control end position stopping and holding process. The present disclosure may be applied to a stopping and holding process other than the feedback control start position stopping and holding process, the reverse position stopping and holding process, and the current-supply end position stopping and holding process.

In the above-described embodiment, the magnetic encoder is used as the encoder 46. However, the encoder 46 may be an optical encoder or a brush encoder. The encoder 46 is not limited to the encoder that outputs the A-phase signal and the B-phase signal and may be an encoder that outputs a Z-phase signal for correction (for index) in addition to the A-phase signal and the B-phase signal.

In the above-described embodiments, the switched reluctance motor (SR motor) is used as the motor 12. However, the motor 12 is not limited to the SR motor and may be any brushless synchronous motor if a rotational position of the motor is detected on the basis of the count value of the output signal of the encoder and a current-supply phase of the motor is sequentially switched.

In the above-described embodiment, the present disclosure is applied to a system including the position switching mechanism that switches the shift position among the P-position, the R-position, the N-position, and the D-position. The present disclosure may be applied to a system including a position switching mechanism that switches a shift position between a P-position and a non-P-position. The present disclosure may be applied to a system including a position switching mechanism that switches a shift position among three positions or more than five positions.

An application of the present disclosure is not limited to a transmission, such as an automatic transmission (AT), continuously variable transmission (CVT), dual-clutch transmission (DCT), and the present disclosure may be applied to a position switching apparatus that switches a shift position of a reduction gear of an electric vehicle. An application of the present disclosure is not limited to the above-described position switching apparatus and may be applied to various position switching apparatuses that use a brushless synchronous motor, such as a SR motor, as a driving force.

What is claimed is:

1. A motor control apparatus comprising:
a motor rotating a controlled object;
an encoder outputting a pulse signal in synchronization with a rotation of the motor; and
a control section performing a feedback control in which each time a target rotational position is changed, the control section sequentially switches a current-supply phase of the motor on the basis of a count value of the pulse signal outputted from the encoder so as to rotate the motor to the target rotational position, the control section stopping supplying electric current to the motor after performing the feedback control, wherein
the control section includes a stopping and holding control portion,
the stopping and holding control portion performs a stopping and holding process in which the stopping and holding control portion supplies electric current to the motor so as to stop and hold the motor for a current-supply holding time, and
the stopping and holding control portion sets the current-supply holding time on the basis of a rotation speed of the motor just before the stopping and holding process.

2. The motor control apparatus according to claim 1, wherein
the stopping and holding control portion increases the current-supply holding time with increase in the rotation speed of the motor just before the stopping and holding process.

3. The motor control apparatus according to claim 1, wherein
the stopping and holding control portion corrects the current-supply holding time on the basis of at least one of a temperature of the motor and the supply voltage of the motor just before the stopping and holding process.

4. The motor control apparatus according to claim 3, wherein
the stopping and holding control portion increases the current-supply holding time with increase in the temperature of the motor just before the stopping and holding process.

5. The motor control apparatus according to claim 3, wherein
the stopping and holding control portion increases the current-supply holding time with decrease in the supply voltage of the motor just before the stopping and holding process.

6. The motor control apparatus according to claim 1, wherein
the stopping and holding process includes a feedback control start position stopping and holding process,
the stopping and holding control portion performs the feedback control start position stopping and holding process for the current-supply holding time when the control section starts the feedback control from a state where electric current is not supplied to the motor, and
in the feedback control start position stopping and holding process, the stopping and holding control portion supplies electric current to the motor so as to stop and hold the motor at a rotational position at a start of the feedback control.

7. The motor control apparatus according to claim 1, wherein
the stopping and holding process includes a reverse position stopping and holding process,
the stopping and holding control portion performs the reverse position stopping and holding process for the current-supply holding time when the target rotational position is changed in the feedback control and a rotation direction of the motor needs to be reversed, and in the reverse position stopping and holding process, the stopping and holding control portion supplies electric current to the motor so as to stop and hold the motor at a rotational position at reverse.

8. The motor control apparatus according to claim 1, wherein
the stopping and holding process includes a feedback control end position stopping and holding process,
the stopping and holding control portion performs the feedback control end position stopping and holding process for the current-supply holding time when the control section ends the feedback control, and
in the feedback control end position stopping and holding process, the stopping and holding control portion supplies electric current to the motor so as to stop and hold the motor at a rotational position at an end of the feedback control.

9. The motor control apparatus according to claim 1, wherein
the motor includes a switched reluctance motor.

10. The motor control apparatus according to claim 1, wherein
the controlled object is a position switching mechanism that switches a shift position.

11. A electronic control unit for controlling a motor configured to rotate a controlled object, the electronic control unit comprising a computer processor and being at least configured to:
receive a pulse signal which is in synchronization with a rotation of the motor;
perform a feedback control in which each time a target rotational position is changed, a current-supply phase of the motor is sequentially switched on the basis of a count value of the pulse signal outputted from the encoder so as to rotate the motor to the target rotational position;
stop supplying electric current to the motor after performing the feedback control; and
provide a stopping and holding control, which performs a stopping and holding process for supplying electric current to the motor so as to stop and hold the motor for a current-supply holding time, wherein the current-supply holding time is set on the basis of a rotation speed of the motor just before the stopping and holding process.

12. The electronic control unit according to claim 11, wherein
the stopping and holding control increases the current-supply holding time with increase in the rotation speed of the motor just before the stopping and holding process.

13. The electronic control unit according to claim 11, wherein
the stopping and holding control corrects the current-supply holding time on the basis of at least one of a temperature of the motor and the supply voltage of the motor just before the stopping and holding process.

14. The electronic control unit according to claim 13, wherein
the stopping and holding control increases the current-supply holding time with increase in the temperature of the motor just before the stopping and holding process.

15. The electronic control unit according to claim 13, wherein
the stopping and holding control increases the current-supply holding time with decrease in the supply voltage of the motor just before the stopping and holding process.

16. The electronic control unit according to claim 11, wherein
the stopping and holding process includes a feedback control start position stopping and holding process,
the stopping and holding control performs the feedback control start position stopping and holding process for the current-supply holding time when the feedback control is started from a state where electric current is not supplied to the motor, and
in the feedback control start position stopping and holding process, the stopping and holding control supplies electric current to the motor so as to stop and hold the motor at a rotational position at a start of the feedback control.

17. The electronic control unit according to claim 11, wherein
the stopping and holding process includes a reverse position stopping and holding process,
the stopping and holding control performs the reverse position stopping and holding process for the current-supply holding time when the target rotational position is changed in the feedback control and a rotation direction of the motor needs to be reversed, and
in the reverse position stopping and holding process, the stopping and holding control supplies electric current to the motor so as to stop and hold the motor at a rotational position at reverse.

18. The electronic control unit according to claim 11, wherein
the stopping and holding process includes a feedback control end position stopping and holding process,
the stopping and holding control performs the feedback control end position stopping and holding process for the current-supply holding time when the feedback control is ended, and
in the feedback control end position stopping and holding process, the stopping and holding control supplies electric current to the motor so as to stop and hold the motor at a rotational position at an end of the feedback control.

19. The electronic control unit according to claim 11, wherein
the motor includes a switched reluctance motor.

20. The electronic control unit according to claim 11, wherein
the controlled object is a position switching mechanism that switches a shift position.

* * * * *